(12) United States Patent
Hausmann

(10) Patent No.: US 10,899,467 B2
(45) Date of Patent: Jan. 26, 2021

(54) ENGINE INLET COVER DETECTION SYSTEM AND METHOD

(71) Applicant: Gulfstream Aerospace Corporation, Savannah, GA (US)

(72) Inventor: Jeffrey Hausmann, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 319 days.

(21) Appl. No.: 15/941,337

(22) Filed: Mar. 30, 2018

(65) Prior Publication Data
US 2019/0300199 A1    Oct. 3, 2019

(51) Int. Cl.
| | |
|---|---|
| B64D 45/00 | (2006.01) |
| B64D 33/02 | (2006.01) |
| F02C 7/26 | (2006.01) |
| G01V 3/08 | (2006.01) |
| G06K 7/10 | (2006.01) |
| G06K 19/07 | (2006.01) |

(52) U.S. Cl.
CPC .......... B64D 45/00 (2013.01); B64D 33/02 (2013.01); F02C 7/26 (2013.01); G01V 3/081 (2013.01); G06K 7/10366 (2013.01); G06K 19/0723 (2013.01); B64D 2033/022 (2013.01); B64D 2045/0085 (2013.01); F05D 2220/323 (2013.01)

(58) Field of Classification Search
None
See application file for complete search history.

(56) References Cited

U.S. PATENT DOCUMENTS

| | | | | |
|---|---|---|---|---|
| 3,688,256 A | * | 8/1972 | D'Ausilio | B60R 25/1012 340/430 |
| 8,052,083 B1 | * | 11/2011 | Moran | B64D 33/02 244/53 B |
| 8,528,312 B1 | | 9/2013 | Shammoh | |
| 2002/0122717 A1 | * | 9/2002 | Ghetzler | F02C 7/042 415/35 |
| 2007/0022723 A1 | * | 2/2007 | Stelzer | B64D 33/02 55/502 |
| 2007/0025838 A1 | * | 2/2007 | Stelzer | B64D 33/02 415/121.2 |
| 2010/0065139 A1 | * | 3/2010 | Osswald | F02C 7/052 137/625.44 |
| 2011/0108676 A1 | | 5/2011 | Colaprisco et al. | |

* cited by examiner

Primary Examiner — Richard M Camby
(74) Attorney, Agent, or Firm — LKGlobal | Lorenz & Kopf, LLP

(57) ABSTRACT

The disclosed embodiments describe cover detection systems, controllers, and aircraft. The aircraft includes the controller and parts of the cover detection systems. A cover detection system includes an engine, a first sensor, an engine cover assembly, and a controller. The engine has moving parts and defines a fluid opening. The fluid opening exposes the moving parts to an ambient environment. The first sensor component is located proximate to the engine. The engine cover assembly includes an engine cover and a second sensor. The engine cover is configured to cover the fluid opening. The second sensor component is attached to the engine cover and is configured to interact with the first sensor component. The controller is configured to determine whether the engine cover is installed on the engine based on an interaction between the first sensor component and the second sensor component.

19 Claims, 3 Drawing Sheets

ENGINE INLET COVER DETECTION SYSTEM AND METHOD

TECHNICAL FIELD

Embodiments of the present invention generally relate to systems and methods for detecting engine inlet covers, and more particularly relate to a system and a method for detecting and indicating installation of an engine inlet cover when starting an engine.

BACKGROUND OF THE INVENTION

An aircraft may be parked for extended periods of time between flights. During these extended periods of time, birds, debris, and other objects may enter an unprotected engine of the aircraft. For example, birds may enter the air inlet or the exhaust of an engine. These objects may damage the engine if the engine is started with the objects still in the engine.

To prevent objects from entering the engines, a cover or a plug is typically used to physically cover the engine inlet or exhaust. These covers or plugs must be removed prior to starting the engines to prevent intake of the cover or plug and damage to the engine. Crew members typically remove these covers or plugs prior to starting the engines. The presence or absence of these conventional covers or plugs must be visually confirmed by crew members prior to starting the engines. The crew members, however, occasionally fail to identify the presence of the cover or plug prior to clearing engine start. In such situations, damage to the engines may occur.

As such, it is desirable to provide a cover detection system, an engine cover, and an aircraft that reduce the risk of damage to the engines. In addition, other desirable features and characteristics will become apparent from the subsequent summary and detailed description, and the appended claims, taken in conjunction with the accompanying drawings and this background.

SUMMARY

Various non-limiting embodiments of a cover detection system, an engine cover, and an aircraft are disclosed herein.

In a first non-limiting embodiment, a cover detection system includes, but is not limited to, an engine, a first sensor, an engine cover assembly, and a controller. The engine has moving parts and defines a fluid opening. The fluid opening exposes the moving parts to an ambient environment. The first sensor component is located proximate to the engine. The engine cover assembly includes an engine cover and a second sensor. The engine cover is configured to cover the fluid opening. The second sensor component is attached to the engine cover and is configured to interact with the first sensor component. The controller is configured to determine whether the engine cover is installed on the engine based on an interaction between the first sensor component and the second sensor component.

In a second non-limiting embodiment, a controller includes, but is not limited to, a memory unit and a processor. The memory unit is operatively coupled with the processor and has instructions. The instructions and the processor cooperate to configure the controller to determine whether an engine cover is installed on a fluid opening of an aircraft engine based on an interaction between a first sensor component associated with the aircraft and a second sensor component associated with the engine cover.

In a third non-limiting embodiment, an aircraft includes, but is not limited to, an engine, a first sensor, and a controller. The engine has moving parts and defines a fluid opening. The fluid opening exposes the moving parts to an ambient environment. The first sensor component is located proximate to the engine. The controller is configured to determine whether an engine cover is installed on the fluid opening of the aircraft engine based on an interaction between the first sensor component a second sensor component associated with the engine cover.

DESCRIPTION OF THE DRAWINGS

Advantages of the present embodiments will be readily appreciated as the embodiments becomes better understood by reference to the following detailed description, when considered in connection with the accompanying drawings wherein.

DESCRIPTION OF EXEMPLARY EMBODIMENTS

The following detailed description is merely exemplary in nature and is not intended to limit the invention or the application and uses of the invention. Furthermore, there is no intention to be bound by any theory presented in the preceding background or the following detailed description.

In general, the embodiments described herein relate to detection of an engine cover on an engine of an aircraft. Detection of the engine cover is useful when attempting to start the engine. In some embodiments, systems on the aircraft alert the crew that the engine cover is still installed when the crew attempts to start the engine with the cover installed. In some embodiments, the systems of the aircraft inhibit starting the engine when the cover is installed.

Figure 1:
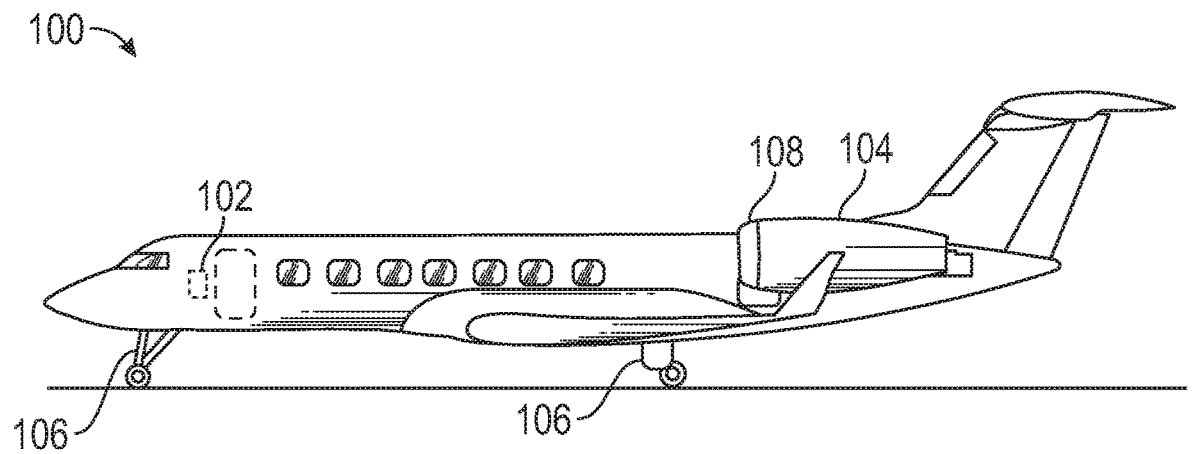
FIG. 1 is a simplified diagram illustrating a non-limiting embodiment of an aircraft in accordance with the teachings of the present disclosure.

FIG. 1 illustrates a non-limiting embodiment of an aircraft 100 in accordance with teachings of the present disclosure. Although the context of the discussion contained herein is with respect to a business jet, it should be understood that the teachings of the present disclosure are compatible with all types of aircraft including, but not limited to, private jets, commercial jet passenger aircraft, cargo aircraft, military aircraft, and the like. Furthermore, although the disclosure herein describes an aircraft, it should be understood that the present disclosure is compatible with all types of vehicles. For example, and without limitation, the embodiments disclosed herein may be implemented on board automobiles, buses, trains, ships, spacecraft, and any other type of conveyance with engines that may be damaged by operation with a cover installed. Additionally, the disclosure herein is not limited to implementation on vehicles, but may also be utilized in tents, houses, buildings, stadiums, theaters, and other permanent and/or semi-permanent structures with machinery that may be damaged by operating with a cover installed. Aircraft 100 includes an avionics system 102, an engine 104, landing gear 106, and an engine cover assembly 108.

Figure 2:
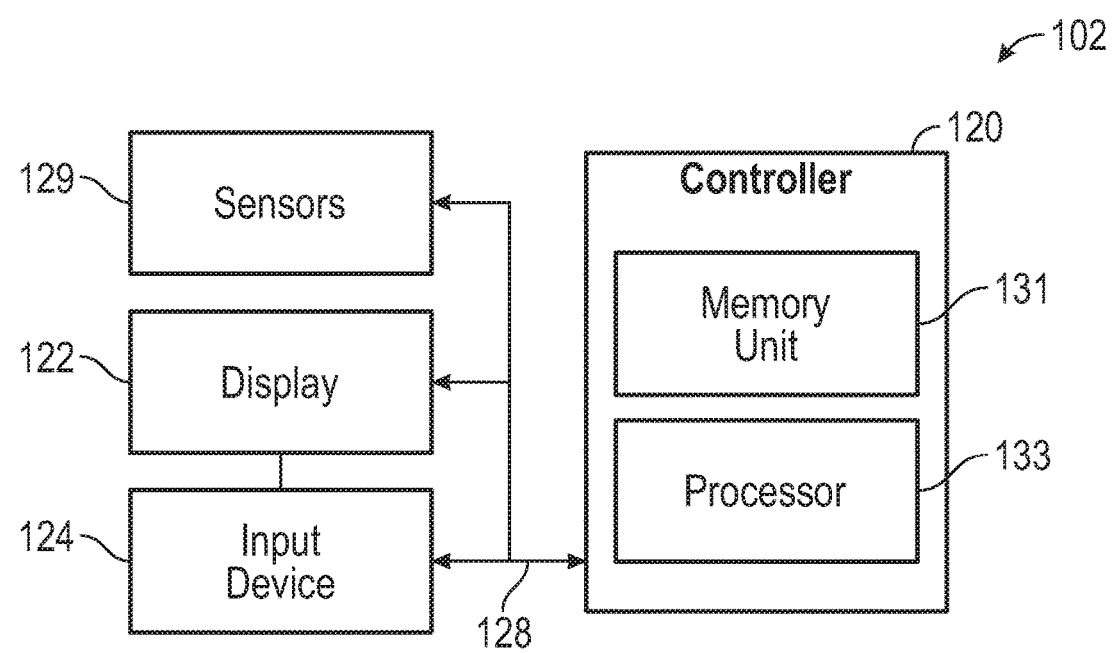
FIG. 2 is a simplified block diagram illustrating a non-limiting embodiment of an avionics system of the aircraft of FIG. 1.

Referring now to FIG. 2, and with continued reference to FIG. 1, avionics system 102 includes a controller 120, a display 122, an input device 124, an interconnect 128, and sensors 129. Interconnect 128 communicatively couples controller 120, display 122, and input device 124 for electronic communication. In the example provided, interconnect 128 is a communication or network bus, as will be appreciated by those with ordinary skill in the art. It should be appreciated that any suitable network topology or physical medium may be utilized for electronic communication in avionics system 102. In some embodiments, interconnect 128 is a wireless communications network.

Controller 120 is a hardware device that carries out instructions of a computer program, as is well known to those of ordinary skill in the art. Controller 120 is configured to execute the computer program to provide the functions described in the methods below. In some embodiments, controller 120 may be configured to provide the functions of a conventional flight management system (FMS) in addition to performing the operations of the methods described herein. Controller 120 includes one or more memory units 131 that store electronic data and computer programs. For example, memory units 131 may be flash memory, spin-transfer torque random access memory (STT-RAM), magnetic memory, phase-change memory (PCM), dynamic random access memory (DRAM), or other suitable electronic storage media. In the example provided, memory units 131 store control logic with instructions that cooperate with a processor 133 of controller 120 to perform operations of the method described below. In some embodiments, processor 133 may include one or more central processing units ("CPUs"), a microprocessor, an application specific integrated circuit ("ASIC"), a microcontroller, and/or other suitable device. Furthermore, controller 120 may utilize multiple hardware devices cooperating to provide the functions described below.

Input device 124 receives user inputs from pilots and crew of aircraft 100. Input device 124 may include switches, buttons, knobs, trackballs, control sticks, or any other suitable mechanism or feature for receiving input from crew members. In the example provided, input device 124 includes a touchscreen integrated with display 122. In some embodiments, input devices 124 may include microphones for voice recognition, or may be integrated with gesture sensors. It should be appreciated that other input devices 124 may be utilized without departing from the scope of the present disclosure.

Display 122 may be a single unit or may include multiple units. Each unit of display 122 is an electronic display that is electronically coupled with controller 120 to visually present information and data in an image according to electronic signals generated by controller 120. For example, display 122 may include cathode ray tubes ("CRT"), light-emitting diodes ("LED"), plasma panels, liquid crystal displays ("LCD"), projected images from a Digital Light Processing ("DLP") projector, and/or any other suitable electronic display technology.

Sensors 129 collect information about various systems, components, and conditions for use by avionics system 102. For example, sensors 129 may include airspeed sensors, fuel level sensors, weight on wheel sensors, proximity sensors, and any other sensors that may be used by avionics system 102.

Figure 3:
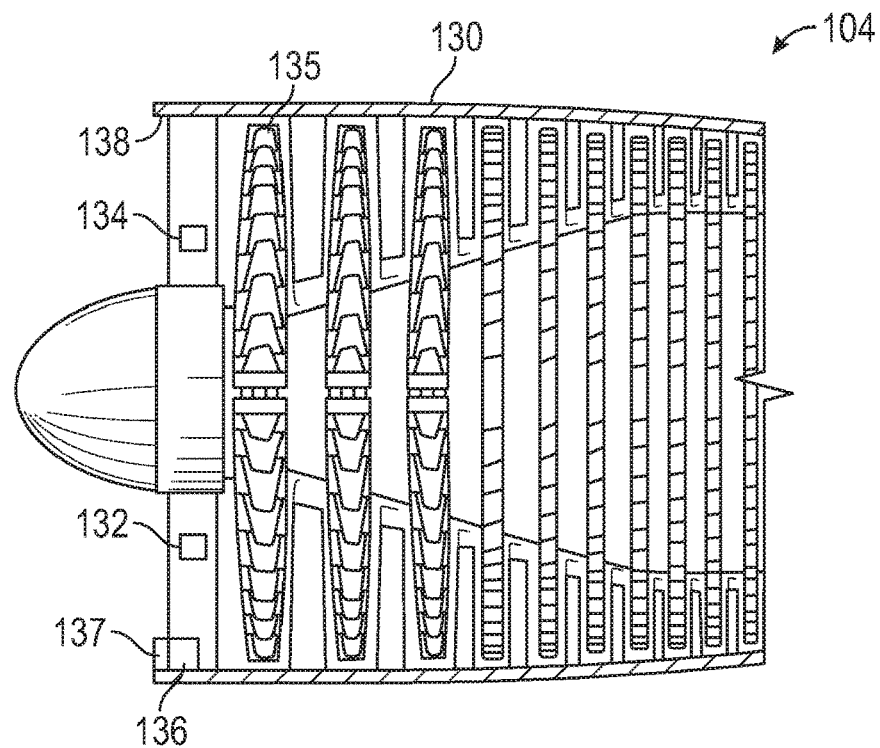
FIG. 3 is a cross section view of an engine of the aircraft of FIG. 1.

Referring now to FIG. 3, and with continued reference to FIGS. 1-2, engine 104 includes a housing 130, a radio frequency identification (RFID) tag reader sensor 132, a magnetic detector sensor 134, a switch sensor 136, and moving parts 135. Housing 130 surrounds and protects moving parts 135, defines a fluid opening 138, and defines a pin slot 137. Fluid opening 138 exposes moving parts 135 to an ambient environment. In the example provided, housing 130 is a nacelle, engine 104 is a turbofan jet engine, and fluid opening 138 is an air intake. In some embodiments, fluid opening 138 is an exhaust. It should be appreciated that other types of engine or machinery may be protected by engine cover assembly 108 without departing from the scope of the present disclosure.

RFID tag reader sensor 132, magnetic detector sensor 134, and switch sensor 136 are sensor components that are proximate to engine 104 and are configured to interact with the sensor components of engine cover assembly 108 by detecting a presence of the sensor components of engine cover assembly 108, as will be further described below. The sensor components are proximate to engine 104 when they are within a sensor range of the sensor components when used with sensor components of engine cover assembly 108. For example, the sensor components may be proximate to engine 104 by being attached to engine 104 within housing 130 or may be proximate to engine 104 by being disposed in an airframe of aircraft 100 within sensing range of fluid opening 138. In the example provided, RFID tag reader sensor 132, magnetic detector sensor 134, and switch sensor 136 are configured to generate a sensor signal indicating an interaction between the sensors 132, 134, 136 and the sensor components of engine cover assembly 108. As used herein, the term "sensor component" refers to either an active sensor reader (e.g., an RFID tag reader, a magnetic detector, a switch) or a passive sensed element that is configured to be detected by the active reader (e.g., an RFID tag, a magnet, or a pin for closing a switch).

In some embodiments, only one of RFID tag reader sensor 132, magnetic detector sensor 134, and switch sensor 136 is included in engine 104. It should be appreciated that any type of sensor in any number or combination suitable for detecting the installation of engine cover assembly 108 may be incorporated without departing from the scope of the present disclosure.

Moving parts 135 may be any moving component within engine 104 that may be damaged by operation of engine 104 with animals or debris present near moving parts 135. In the turbofan example provided, moving parts 135 include rotating fan blades, as will be appreciated by those with ordinary skill in the art. In other examples, moving parts 135 may be belts/pulleys, piston rods, rotating shafts, gearsets, or any other moving parts that may be damaged by operating with animals or debris present.

Landing gear 106 supports aircraft 100 while aircraft 100 is on the ground. In the example provided, landing gear 106 includes a weight on wheels sensor of sensors 129. Weight on wheels sensors are flight status sensors configured to detect when aircraft 100 is in flight or on the ground. In some embodiments, different sensors 129 may be utilized to determine when aircraft 100 is in flight. For example, speed sensors or altitude sensors may be utilized to determine whether aircraft 100 is in flight.

Figure 4:
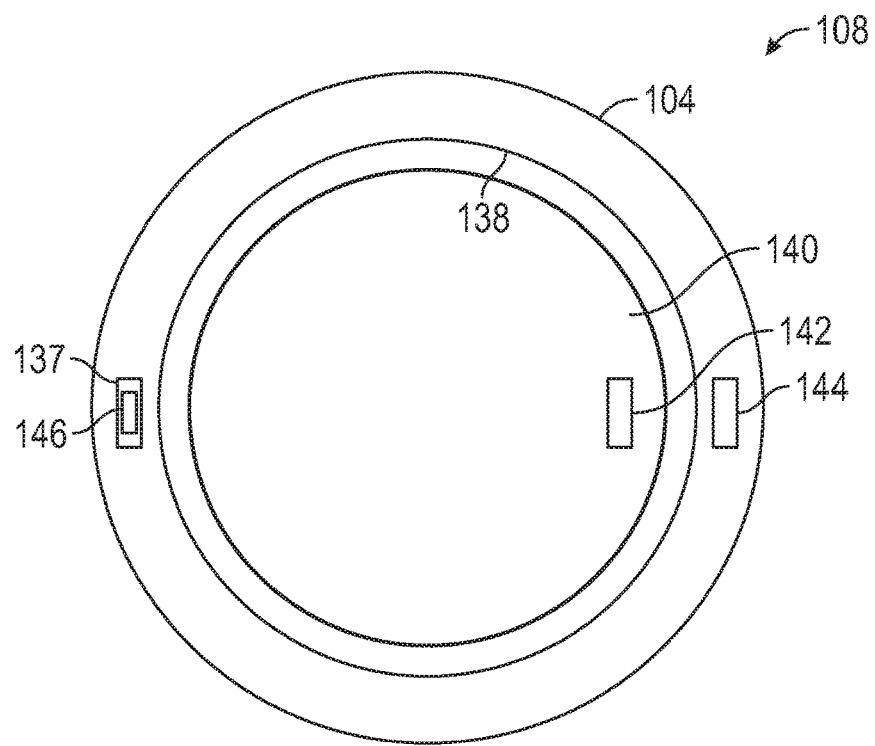
FIG. 4 is a front view of the engine cover assembly of FIG. 1.

Referring now to FIG. 4, and with continued reference to FIGS. 1-3, engine cover assembly 108 includes an engine cover 140, an RFID tag 142, a magnet 144, and a pin 146. Engine cover 140 is configured to cover fluid opening 138. As used herein, to "cover" means to physically obstruct to restrict entry of animals and engine damaging debris. In the example provided, engine cover 140 is a plug that inserts into fluid opening 138. In some embodiments, engine cover 140 is a sheet or tarp configured to contact a lip of housing 130 at fluid opening 138. In each configuration, engine cover assembly 108 is completely separable from engine 104 and is typically stored in a baggage compartment of aircraft 100 or remains at an airport while aircraft 100 is flying.

RFID tag 142, magnet 144, and pin 146 are sensor components and are attached to engine cover 140. For example, RFID tag 142 and magnet 144 may be sown into or adhered to engine cover 140, and pin 146 may be secured by a lanyard to engine cover 140. RFID tag 142 is configured to interact with RFID tag reader sensor 132, magnet 144 is configured to interact with magnetic detector sensor 134, and pin 146 is configured to be inserted into pin slot 137 to interact with switch sensor 136. The interaction between sensor components 142, 144, 146 and sensor components 132, 134, 136 indicates whether engine cover 140 is installed on engine 104. It should be appreciated that the number and type of sensor components included in engine cover assembly 108 may vary and typically corresponds to the number and type of sensor components on engine 104 (e.g., RFID tag reader sensor 132, magnetic detector sensor 134, and/or switch sensor 136).

Figure 5:
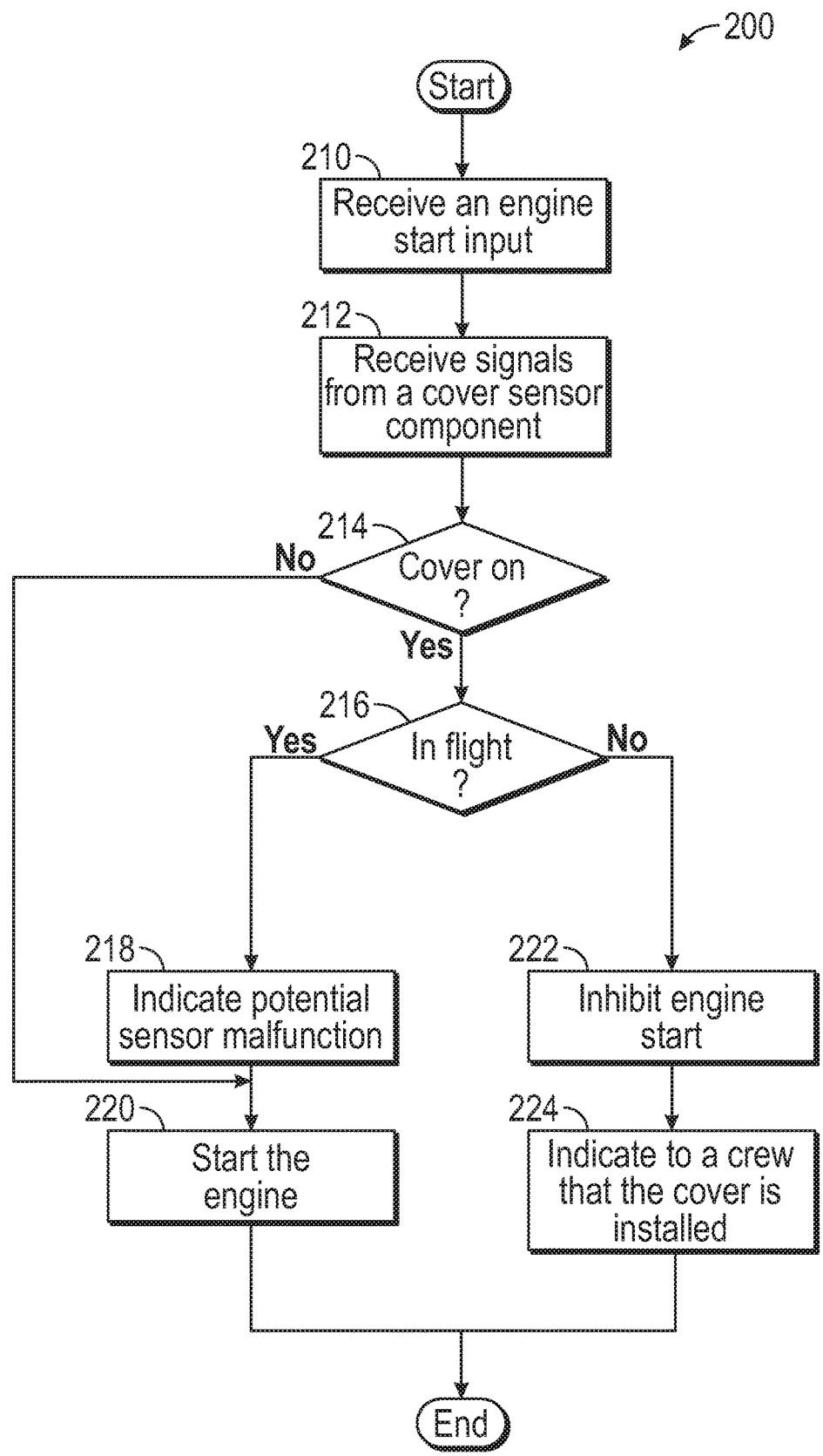
FIG. 5 is a flow diagram illustrating a non-limiting embodiment of a method for starting an aircraft engine in accordance with the teachings of the present disclosure.

Referring now to FIG. 5, and with continued reference to FIGS. 1-4, a method 200 for starting an engine of an aircraft is illustrated in flow diagram form. In the example provided, tasks of method 200 are performed by controller 120. Task 210 receives an engine start input. For example, a crew member may use input device 124 to instruct controller 120 to start engine 104. Controller 120 then receives the engine start input from input device 124. Task 212 receives signals from an engine cover sensor component. For example, controller 120 may receive the sensor signal from RFID tag reader sensor 132, magnetic detector sensor 134, and/or switch sensor 136. In some embodiments, controller 120 may receive sensor signals from other sensors configured to indicate whether engine cover 140 is installed in engine 104.

Task 214 determines whether an engine cover is installed on the engine based on a sensor signal caused by an interaction between a second sensor and a first sensor. For example, controller 120 may determine that engine cover 140 is installed over fluid opening 138 when RFID tag 142 is near RFID tag reader sensor 132, when magnet 144 is near magnetic detector sensor 134, and/or when pin 146 is pressing against and closing switch sensor 136. When the engine cover is not installed, method 200 proceeds to task 220 described below. When the engine cover is installed, method 200 proceeds to task 216.

Task 216 determines whether the aircraft in in flight. Determining whether the aircraft is in flight limits the risk of preventing in flight engine restart if the engine cover sensor malfunctions and the engine turns off during flight. For example, controller 120 may determine whether aircraft 100 is in flight based on signals from a weight on wheels sensor of landing gear 206, from altitude sensors, airspeed sensors, Global Navigation Satellite System (GNSS) sensors, or any other suitable sensors 129 or systems. When the aircraft is not in flight, method 200 proceeds to task 222. When the aircraft is in flight, method 200 proceeds to task 218. In some embodiments, task 216 is omitted and method 200 proceeds directly to task 222 when task 214 determines that the cover is installed.

Task 218 indicates a potential malfunction of the first sensor in response to the sensor signal indicating that the cover is installed while the aircraft is in flight. For example, controller 120 may indicate on display 122 that RFID tag reader sensor 132, magnetic detector sensor 134, and/or switch sensor 136 may be malfunctioning if controller 120 receives the sensor signal while aircraft 100 is in flight. In the example provided, being in flight makes installation of engine cover 140 on engine 104 unlikely. For example, aircraft 100 typically utilizes engine 104 for takeoff, and prior utilization of engine 104 for takeoff is inconsistent with an installed engine cover 140, as will be appreciated by those with ordinary skill in the art.

Task 220 starts the engine. Task 220 may start the engine in response to receipt of the engine start input while the flight sensor indicates that the aircraft is in flight or may start the engine in response to determining that the cover is not installed without consideration of whether the aircraft is in flight. In the example provided, controller 120 ignites engine 104 in response to receiving the engine start input and after determining that either engine cover 140 is not installed or aircraft 100 is in flight.

Task 222 inhibits engine start of the engine in response to receipt of the engine start input while the flight status sensor indicates that the aircraft is not in flight and the sensor signal indicates that the cover is installed. Task 224 indicates on the display that the cover is installed in response to receiving the engine start input while the sensor signal indicates that the cover is installed. For example, controller 120 may cause display 122 to present a graphic or text indicating that engine cover 140 is installed on engine 104.

Accordingly, method 200 inhibits engine start when an engine cover is installed. Method 200 further allows engine start when the aircraft is in flight to allow engine restart in flight if there is a sensor malfunction indicating that the engine cover is installed when the engine cover is not installed.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A cover detection system, comprising:
    an engine having moving parts and defining a fluid opening, wherein the fluid opening exposes the moving parts to an ambient environment and remains uncovered during operation of the engine;
    a first sensor component proximate to the engine;
    an engine cover assembly comprising:
        an engine cover configured to cover the fluid opening and to be completely separated from the engine during operation of the engine; and
        a second sensor component attached to the engine cover and configured to interact with the first sensor component; and
    a controller configured to determine whether the engine cover is installed on the engine based on an interaction between the first sensor component and the second sensor component.

2. The cover detection system of claim 1, wherein the second sensor component is configured to generate a sensor signal indicating the interaction between the first sensor component and the second sensor component, and wherein the controller is further configured to determine whether the engine cover is installed based on the sensor signal.

3. The cover detection system of claim 2, further comprising a display, and wherein the controller is further configured to indicate on the display that the cover is installed in response to receiving an engine start input while the sensor signal indicates that the cover is installed.

4. The cover detection system of claim 2, further comprising a flight status sensor configured to indicate whether an aircraft is in flight, and wherein the controller is further configured to inhibit an engine start of the engine in response to receipt of an engine start input while the flight status sensor indicates that the aircraft is not in flight and the sensor signal indicates that the cover is installed.

5. The cover detection system of claim 4, wherein the controller is further configured to start the engine in response to receipt of the engine start input while the flight status sensor indicates that the aircraft is in flight.

6. The cover detection system of claim 5, wherein the controller is further configured to indicate a potential malfunction of the second sensor component in response to the sensor signal indicating that the cover is installed while the aircraft is in flight.

7. The cover detection system of claim 1, wherein the fluid opening is an air intake.

8. The cover detection system of claim 1, wherein the engine cover is a plug.

9. The cover detection system of claim 1, wherein the second sensor component is configured to interact with the first sensor component by detecting a presence of the first sensor component.

10. The cover detection system of claim 9, wherein the second sensor component is a Radio Frequency Identification (RFID) tag and the first sensor component is an RFID tag reader.

11. The cover detection system of claim 9, wherein the second sensor component is a magnet and the first sensor component is a magnetic detector.

12. The cover detection system of claim 9, wherein the second sensor component is a pin and the first sensor component is a switch.

13. A controller, comprising:
a processor; and
a memory unit operatively coupled with the processor, the memory unit having instructions, the instructions and the processor cooperating to configure the controller to:
determine whether an engine cover is installed on a fluid opening of an engine of an aircraft based on an interaction between a first sensor component associated with the aircraft and a second sensor component associated with the engine cover; and
cause a display to indicate that the engine cover is installed in response to receiving an engine start input while the interaction indicates that the engine cover is installed.

14. The controller of claim 13, wherein the controller is further configured to inhibit an engine start of the engine in response to receipt of an engine start input while a flight status sensor indicates that the aircraft is not in flight and the interaction indicates that the engine cover is installed.

15. The controller of claim 13, wherein the controller is further configured to start the engine in response to receipt of an engine start input while the interaction indicates that the aircraft is in flight.

16. The controller of claim 13, wherein the controller is further configured to indicate a potential malfunction of the second sensor component in response to the interaction indicating that the engine cover is installed while the aircraft is in flight.

17. The controller of claim 13, wherein the controller further configured to read a Radio Frequency Identification (RFID) tag as the second sensor component using an RFID tag reader as the first sensor component.

18. The controller of claim 13, wherein the controller is further configured to detect a magnet as the second sensor component using a magnetic detector as the first sensor component.

19. An aircraft, comprising:
an engine having moving parts and defining a fluid opening, wherein the fluid opening exposes the moving parts to an ambient environment;
a first sensor component proximate to the engine; and
a controller configured to:
determine whether an engine cover is installed on the fluid opening of the engine based on an interaction between the first sensor component a second sensor component associated with the engine cover; and
inhibit an engine start of the engine based on whether the engine cover is installed on the fluid opening.

* * * * *